United States Patent

[11] 3,593,094

[72] Inventor Takao Katsumaru
 Sakai, Japan
[21] Appl. No. 33,426
[22] Filed Apr. 30, 1970
[45] Patented July 13, 1971
[73] Assignee Shin Nippon Koki Co., Ltd.
 Osaka, Japan
[32] Priority May 7, 1969
[33] Japan
[31] S 44/35354

[54] AUTOMATIC LEVEL ADJUSTING MEANS FOR SUSTAINING THE CROSSRAIL USED IN DOUBLE HOUSING TYPE MACHINE TOOLS IN ITS ACCURATE HORIZONTAL POSITION
3 Claims, 5 Drawing Figs.
[52] U.S. Cl. .................................................. 318/608,
 318/649, 318/8
[51] Int. Cl. .................................................. G05b 1/01

[50] Field of Search ........................................ 318/575, 8,
 52, 488, 608, 649

[56] References Cited
UNITED STATES PATENTS
3,179,864  4/1965  Kramer ....................... 318/608
3,396,320  8/1968  Good ........................... 318/608
3,401,321  9/1968  Miki ............................ 318/608 X Primary Examiner—Benjamin Dobeck
Attorney—Ernest G. Montague ABSTRACT: In a large-sized double housing type machine tool, an automatic level adjusting means for sustaining the crossrail in its accurate horizontal position is provided; said means comprises a pair of electrosensing elements for detecting the crossrail losing its horizontal balance in the course of shift or swivel of the toolhead mounted on said crossrail, adjustment signal transfer circuit connected to said electrosensing elements, a servomotor means adapted to be driven when receiving said adjustment signal, and compensating gear means coupled with said servomotor means.

AUTOMATIC LEVEL ADJUSTING MEANS FOR SUSTAINING THE CROSSRAIL USED IN DOUBLE HOUSING TYPE MACHINE TOOLS IN ITS ACCURATE HORIZONTAL POSITION

This invention relates generally to a level adjusting means, and more particularly is directed to automatic level adjusting means for sustaining the crossrail used in double-housing-type machine tools in its accurate horizontal position, comprising a pair of electrosensing elements for detecting the crossrail losing its horizontal balance in the course of shift or swivel of a toolhead or heads mounted on said crossrail; adjustment signal transfer circuit connected to said electrosensing elements; a servomotor means adapted to be driven when receiving said adjustment signal, and compensating gear means coupled with said servomotor means.

As is well known, in machining operation by use of the conventional double housing type machine tools such as planers and planomillers having one or more toolheads carried on the crossrail which is adjustable up and down with respect to the columns flanking the bed, the actual running operation must be proceeded in the manner as follows. That is, as a first step, the toolhead slidably mounted on the crossrail must be placed to the center portion of said crossrail by sliding the same along the latter so that the load caused by the gravity of the toolhead may be equally distributed to either of the crossrail sustaining feed screw and that the crossrail may be well balanced. As a second step, the crossrail is moved up or down to a desired cutting position by means of crossrail elevating feed screws. When having reached said desired position, the crossrail must be stopped once and clamped or fixed, at the opposite ends thereof, to the two upright housings in order to keep its previously adjusted level position. For the first time after these three steps, the toolhead can be shifted laterally to a desired cutting position without causing the horizontal unbalance in the crossrail, thereby effective cutting work can be carried out by reciprocating the table past the cutting tool held in the tool toolhead. When shifting the toolhead to another desired cutting position, it is of course required to repeat the same operations as described above.

Furthermore, in such conventional double housing type machine tools of the construction as described above, the crossrail feed mechanism is directed only to the function of positioning and not to the function of machining by use of same at all. In other words, it has been almost impossible to develop precise cutting by means of crossrail feed mechanism employed in the large-sized machine tools.

On the other hand, there arises a strong demand for machine tools capable of developing precise machining by way of giving downward and/or upward cutting feed to the crossrail itself. This is because economy in time and labor followed by less idle time can be easily attained by provision of the mechanism in which precision machining not only on horizontal surfaces but also vertical surfaces of large works can be carried out by way of giving cutting feed to the crossrail itself.

However, in order to satisfy the above-mentioned users' demand, one main problem must have been settled, that is to say, the problem of how to develop precision machining against the tendency of the crossrail to lose its horizontal balance by different axial strains or longitudinal deformations developed in each crossrail sustaining feed screw in the course of shift or swivel of the toolhead.

It is therefore an object of this invention to overcome the above technical difficulties.

It is another object of this invention to provide a novel and useful level adjusting means for sustaining the crossrail used in double housing type machine tools in its accurate horizontal position.

It is a further object of this invention to develop precision machining by means of crossrail feed mechanism.

It is yet a further object of this invention to provide a mechanism which facilitates machining on vertical surfaces and boring works, as well.

It is a still further object of this invention to provide an automatic level adjusting means for sustaining the crossrail used in double housing type machine tools in its accurate horizontal position which will permit manufacture at a relatively low cost.

It is yet a still further object of this invention to provide a double housing type machine tools equipped with the automatic crossrail level adjusting means that is simple to operate and capable of rationalization in working process.

These and other objects and advantages of the present invention will become more apparent from the following description made with reference to a preferred embodiment of the invention shown by way of example in the accompanying drawings and from the appended claims.

Figure 2:
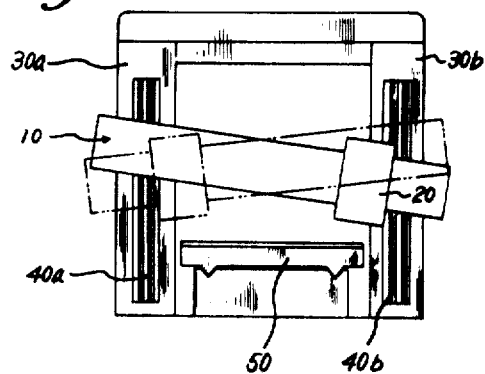
FIG. 2 is a diagrammatic front elevation of the double housing type machine tool of FIG. 1 with the crossrail in its exaggeratedly unbalanced positions for the explanatory purpose, one of said crossrail positions being shown in phantom lines.
Figure 1:
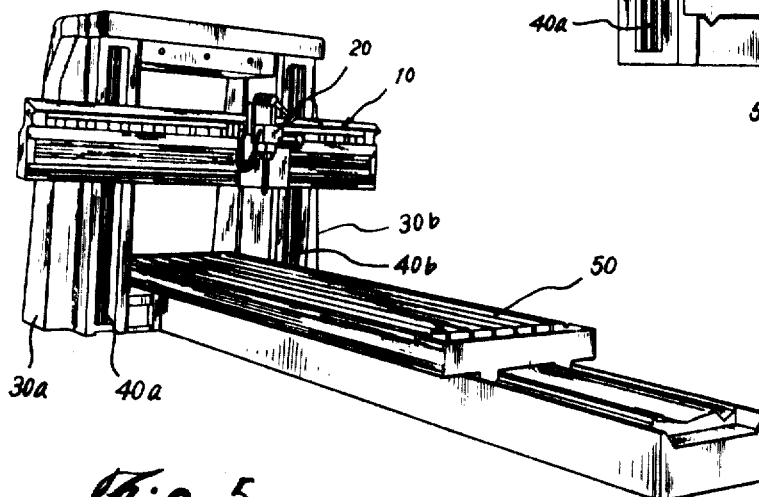
FIG. 1 is a schematic showing of one form of general type double housing machine tools.
Figure 3:
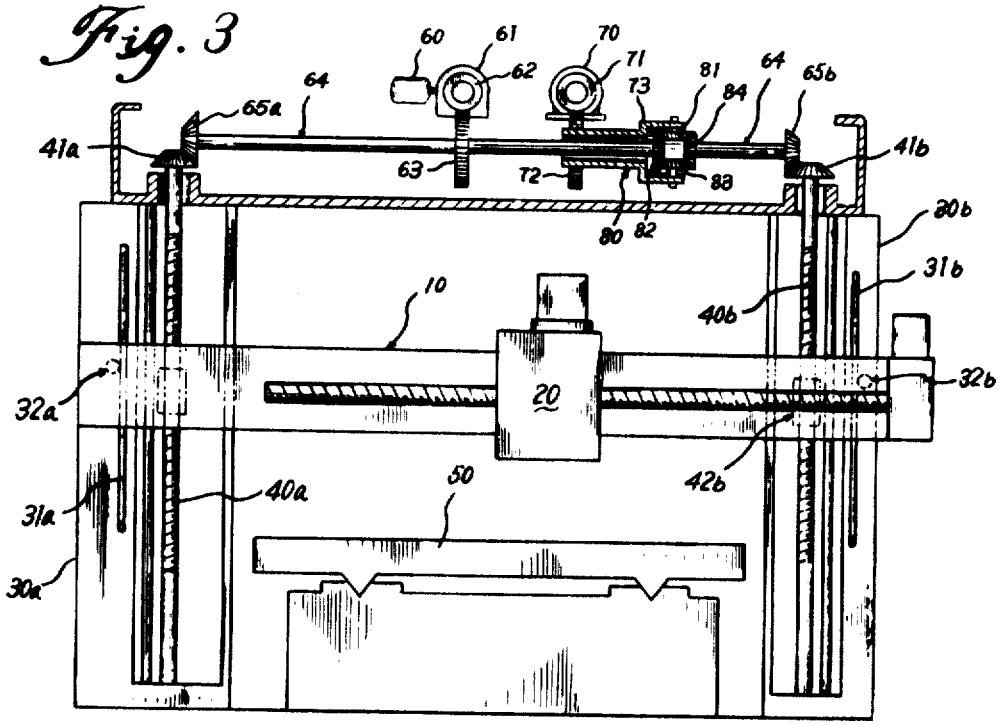
FIG. 3 is a fragmentary elevational view showing one preferred example of the mechanical constructions in accordance with this invention.
Figure 4:
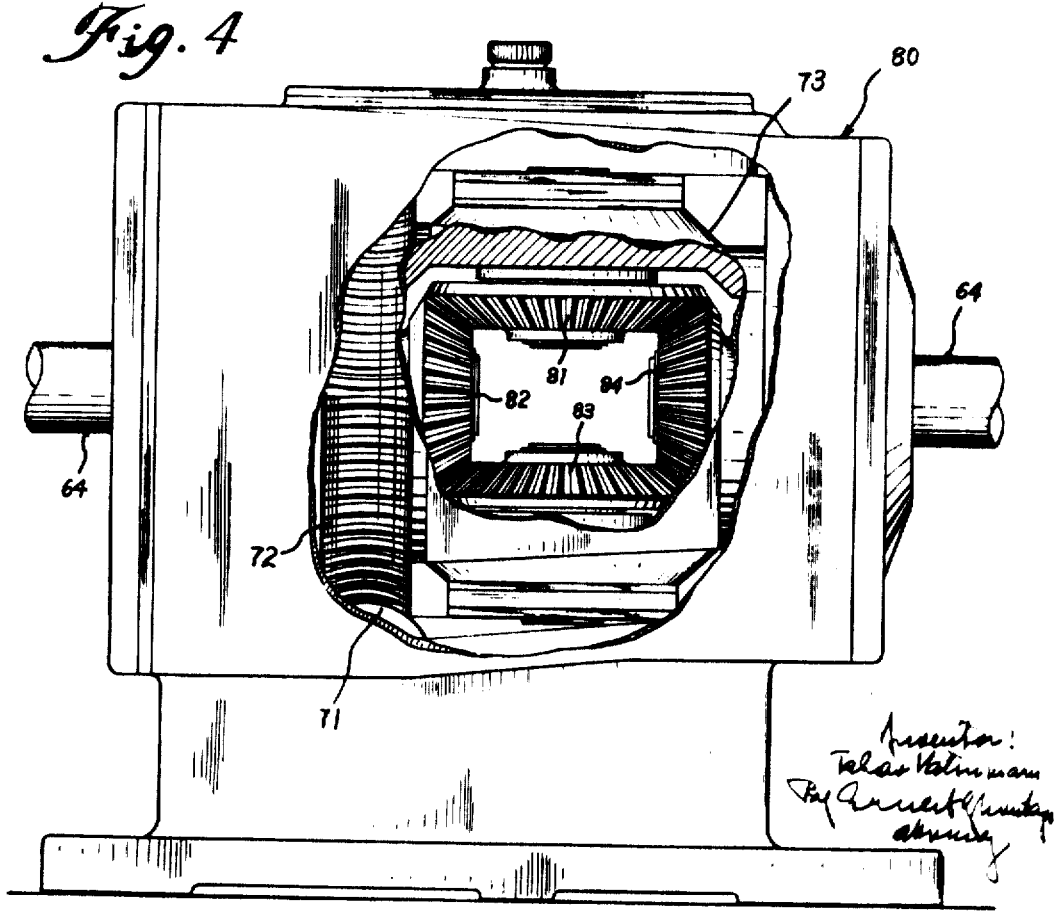
FIG. 4 is an enlarged fragmentary elevation showing another preferred example of differential gear means to be used in this invention, partially broken away for the purpose of illustration.

Referring now to the drawings, most of large-sized double housing machine tools of such type as shown in FIG. 1 include a crossrail 10 which moves up and down with respect to the columns 30a and 30b flanking the bed 50, and at least one laterally slidable toolhead 20 carried on said crossrail. As is shown in FIG. 3, said crossrail 10 is sustained by means of two screw rods 40a and 40b disposed in said column 30a and 30b, respectively.

In the double housing type machine tools in accordance with this invention, there is attached a vertically extending master electroscale 31a on the left column 30a, and on the right column 30b is attached a slave electroscale 31b extending in the same way, both of said scales being in parallel relation with said columns, while disposed adjacent the either end of the crossrail 10 are electrosensing elements 32a and 32b that are positioned opposite to said scale 31a and 31b, respectively, and responsible for the inclination of the crossrail with respect to said electroscales 31a and 31b. In this connection, it is to be noted that in place of said electroscale and sending element combination, a rack and resolver combination may be used in the same manner.

Beveled gears 41a and 41b are secured to said screw rods 40a and 40b, respectively, at the upper end thereof. Thus, the up and down movement of the crossrail 10 are effected by rotational movement is imparted to said beveled gears 41a and 41b by way of further beveled gears 65a and 65b keyed on the driving shaft 64 at the opposite ends thereof, respectively.

Said driving shaft 64 is power driven by the electric motor 60 by way of a suitable speed variator 61 as well as a worm 62 and a worm wheel 63 interconnected each other.

The differential gear means, generally designated by reference numeral 80, comprises a pair of vertically opposed gears 81 and 83 cooperating with a drive sleeve 73 which is imparted power by the servomotor 70 by way of a worm 71 and a worm wheel 72, and a further pair of horizontally opposed gears 82 and 84 that at meshed with said gears 81 and 83 and are secured to said driving shaft 64 at its discontinuous opposed ends in the manner as illustrated in FIG. 3.

In connection with the above description, as far as the worm gearing 62, 63 and 71, 72 are concerned, it will be effectual to use such ones called self-locking worm gearings in this field that have their teeth slightly bevelled, whereby both of said worm gearings 62, 63 and 71, 72 can be advantageously prevented from running counter to the expected rotational movement.

Figure 5:
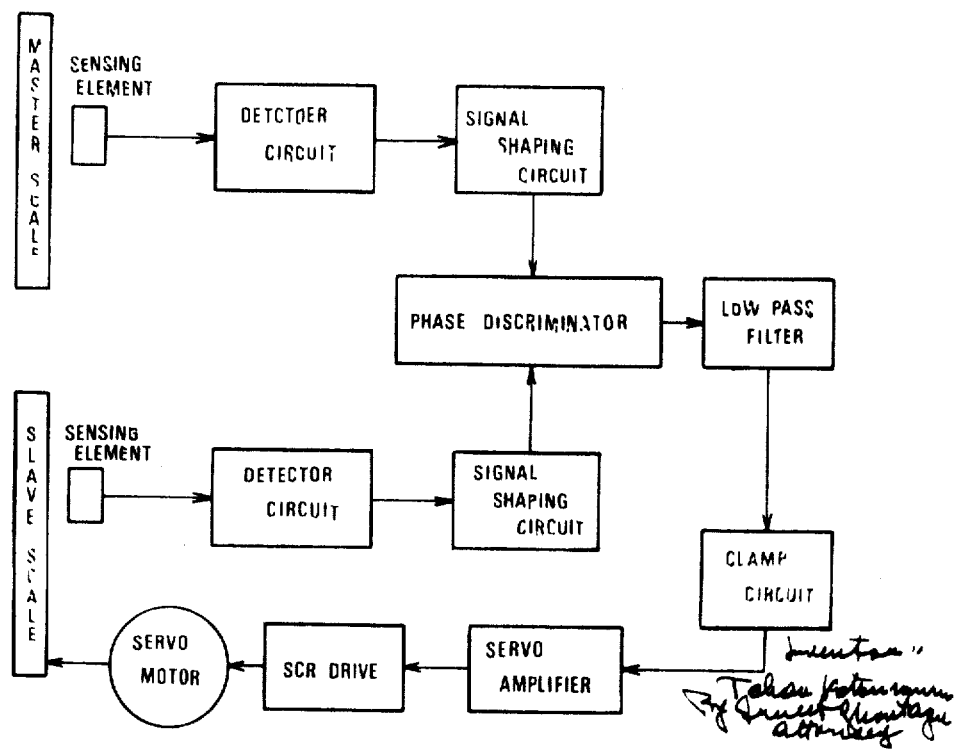
FIG. 5 is a block diagram showing compensating electric circuit to be used in this invention.

Said servomotor 70 starts to drive when receiving an adjustment signal transmitted through the compensating electric circuit shown in FIG. 5. More particularly, the axial strain developed in each of crossrail sustaining screw rods 40a and 40b is detected as an input an energizes said compensating electric circuit, which includes preferably a pair of input members consisting of an electroscale and an electrosensing element, a pair of detector circuits connected to each of said input members, a pair of signal shaping circuits such as Schmidt circuits, connected to each of said detector circuits and producing a shaped output pulse when energized, a phase discriminator for detecting phase difference, a low-pass filter for converting said phase difference into DC level, and clamp circuits as a DC restorer which produces the output corresponding to said phase difference. Said output is relayed to the output member which preferably consists of a servoamplifier, a SCR drive and a servomotor, whereby desired level compensation in the crossrail is effected.

It is to be noted that, preferably at the time of installing the machine tool on any desired place, a pair of electroscales 31a and 31b having the same scale pitches with each other must be set so accurately with respect to each corresponding electrosensing element that phase difference will be presented as nought so long as the crossrail is will levelled.

When the crossrail 10 loses its horizontal balance for some reason, a produced input energizes said compensating circuit, whereby the level compensating servomotor 70 is empowered and operates so as to restore the crossrail to its accurate horizontal position; more particular description of which is as follows:

In the embodiment illustrated in FIG. 3, it is obvious that, in cutting operation, the more leftwards the toolhead 20 is moved, the larger load will be distributed to the screw rod 40a, making the greater difference between the axial elongations in both screw rods 40a and 40b. Consequently, said crossrail 10 will become inclined with its left end down. In this case, it should be understood that the scale 40a has been predetermined to be a master scale serving as a standard, therefore, the detected phase difference will be presented as positive with respect to said standard. While, simultaneously with said detecting operation, a level compensating operation being achieved continuously by lowering the crossrail at the right end, by means of said servomotor 70 and differential gear means generally designated by reference numeral 80.

In contrast thereto, when the toolhead 20 is disposed to the right, the crossrail 10 is inclined to lose its balance with its right end down. The detected phase difference is, of course, to be presented as negative, and the simultaneous level operation goes by contraries.

Furthermore, in process of machining on the vertical surface of a workpiece by feeding the crossrail 10 downwards, when the latter is in its well-balanced position, only the drive motor 60 operates to give a forward turning to the driving shaft 64, which, in turn, drives both of crossrail elevating feed screws 40a and 40b interconnected thereto by two pair of beveled gears 41a, 65a and 41b, 65b, simultaneously in the same right-hand direction. Thus, a downward cutting movement of the crossrail 10 is effected in cooperation with stationary nuts or sleeves 42a and 42b having threaded internal surface engaging with said feed screws, respectively.

On the other hand, when the crossrail losing its balance, the level compensating servomotor is energized by a phase difference output as described hereinbefore and, in turn, drives the worm 71 as well as the worm wheel 72, keyed on which the sleeve 73 and thereby a pair of substantially vertically opposed gears 81 and 83 revolve both round the driving shaft 64 and on coaxial axles thereof journaled in said sleeve 73. More particularly, said gears 81 and 83 move in meshing contact with the peripheral surface of the beveled gear 82 and simultaneously impart an accelerating or reducing rotational movement to the other beveled gear 84. Consequently, said two crossrail elevating feed screws 40a and 40b rotate at a different turning speed, respectively, whereby the crossrail 10 can be sustained successively in its accurate level position.

Thus, the present invention provides a simple and relatively inexpensive automatic crossrail level adjusting means which may be conveniently employed with large-sized double housing machine tools, such as planers, planomillers and other similar type machine tools.

It will be understood that the invention is not to be limited to the exact construction shown and described, but that various changed and modifications may be made without departing from the spirit and scope of the invention, as defined in the appended claims.

What I claim is :

1. An automatic crossrail level adjusting mechanism for use in double housing type machine tools comprising a pair of electroscales, a pair of electrosensing elements for detecting the crossrail losing its horizontal balance, an input signal transfer circuit connected to said electrosensing elements, an output member connected to said circuit, a compensating mechanical means coupled with said output member; said input signal transfer circuit including a pair of detector circuits connected to each of said electrosensing elements, a pair of signal shaping circuits connected to each of said detector circuits and producing a shaped output pulse when energized, a phase discriminator for detecting phase difference, a low-pass filter for converting said phase difference into DC level, at least one clamp circuits as a DC restorer which produces the output corresponding to said phase difference; said output member having a servomotor for level compensating, a SCR drive and a servoamplifier; said compensating mechanical means having a differential gear means.

2. An automatic crossrail level adjusting mechanism for use in double housing type machine tools, as set forth in claim 1, characterized in that a pair of rack means and a pair of resolvers are used for detecting the crossrail losing its horizontal balance.

3. An automatic crossrail level adjusting mechanism for use in double housing type machine tools; as set forth in claim 1, characterized in that photoelectro means are used for detecting the crossrail losing its horizontal balance.